US006591363B1

(12) United States Patent
von Below (10) Patent No.: US 6,591,363 B1
(45) Date of Patent: Jul. 8, 2003

(54) SYSTEM FOR WRITING INCREMENTAL PACKET DATA TO CREATE BOOTABLE OPTICAL MEDIUM BY WRITING BOOT CATALOG AND BOOT IMAGE ONTO SECOND TRACK BEFORE WRITING VOLUME DESCRIPTORS ONTO FIRST TRACK

(75) Inventor: Alexander G. von Below, Aachen (DE)

(73) Assignee: Roxio, Inc., Santa Clara, CA (US)

( * ) Notice: Subject to any disclaimer, the term of this patent is extended or adjusted under 35 U.S.C. 154(b) by 0 days.

(21) Appl. No.: 09/464,325

(22) Filed: Dec. 15, 1999

(51) Int. Cl.[7] .................................................. G06F 9/24
(52) U.S. Cl. ............................................. 713/2; 360/18
(58) Field of Search ................................ 713/1, 2, 100; 711/1, 4, 171, 172, 173; 360/18, 331–333, 335

(56) References Cited

U.S. PATENT DOCUMENTS

| 5,475,540 A |   | 12/1995 | Gold ............................ 360/48 |
| 5,623,470 A |   | 4/1997  | Asthana et al. ................ 369/58 |
| 6,091,686 A |   | 7/2000  | Caffarelli et al. .............. 369/58 |
| 6,122,734 A | * | 9/2000  | Jeon .............................. 713/2 |
| 6,304,965 B1| * | 10/2001 | Rickey ........................... 713/2 |

OTHER PUBLICATIONS

Unknown, "*Volume and File Structure of CDROM for Information Interchange*", Standard ECMA–119, 2nd Ed., Dec. 1987, Reprint Sep. 1998. <http://www.ecma.ch>.

Unknown, "*Universal Disk Format™ Specification*", OSTA–2, Rev. 2.00, Apr. 3, 1998, Optical Storage Technology Assn., Santa Barbara, CA.

Stevens and Merkin, "*'El Torito' Bootable CD–ROM Format Specification*", Version 1.0, pp. 1–20, Jan. 25, 1995, Phoenix Technologies and IBM.

Unknown, "*Volume and File Structure for Write–Once and Rewritable Media Using Non–Sequential Recording for Information Interchange*", Standard ECMA–167, 3rd Ed., Jun. 1997. <http://www.ecma.ch>.

* cited by examiner

Primary Examiner—Thomas Lee
Assistant Examiner—Thuan Du
(74) Attorney, Agent, or Firm—Martine & Penilla, LLP (57) ABSTRACT

The present invention provides a method and a computer readable medium for writing incremental packet data to create a bootable optical medium. In this method, a first track is reserved in an optical medium. Additionally, a first track gap after the first track is reserved in the optical medium. After reserving the first track and first track gap, a boot catalog and a boot image are written onto a second track in the optical medium. The boot catalog includes a first pointer to the location of the boot image. Further, the boot catalog and the boot image are written so that the boot image is written contiguously without interruption. Preferably, the second track is written in a track-at-once mode to ensure that the boot image is written without interruption. Alternatively, the second track and the second track may be written in a streaming mode in a single packet after writing the first track and track gap. The first reserved track is then written by writing a primary volume descriptor, a boot record volume descriptor, and a first anchor volume descriptor pointer. The boot record volume descriptor includes a second pointer to the location of the boot catalog.

32 Claims, 6 Drawing Sheets

| Blocks | | Information |
|---|---|---|
| Decimal | Hex. | |
| 0 | 0 | NULL |
| ... | | |
| 16 | 10 | ISO Primary Volume Descriptor |
| 17 | 11 | ElTorito Bootrecord |
| 18 | 12 | ISO Volume Descriptor Terminator |
| 19 | 13 | Begin Extended Area(BEA) |
| 20 | 14 | NSR02 |
| 21 | 15 | Terminating Extended Area(TEA) |
| 22 | 16 | L-Path Table |
| 23 | 17 | M-Path Table |
| 24 | 18 | Root Directory |
| 25 | 19 | Autoexec.bat |
| | | Autorun.ini |
| | | Autorun.inf |
| | | UDFReader |
| | | ReadMe |
| | | NULL (max. 462 kB) |
| ... | | |
| 256 | 100 | AVDP |
| 257 | 101 | PVD |
| 258 | 102 | PD for Partition 0 |
| 259 | 103 | PD for Partition 1 |
| 260 | 104 | USD |
| 261 | 105 | Logical Volume Descriptor |
| 262 | 106 | Implementation Use Volume Descriptor |
| 263 | 107 | Terminating Descriptor |
| 264 | 108 | Logical Volume Integrity Descriptor |
| 265 | 109 | Terminating Descriptor |
| 266 | 10A | NULL (82 Blocks, 164kB) |
| ... | | |
| 348 | 15C | Block pre-and trackgap (152 Blocks) |
| ... | | |
| 500 | 1F4 | UDF PVD |
| 501 | 1F5 | UDF PD |
| 502 | 1F6 | UDF Unallocated Space Descriptor |
| 503 | 1F7 | UDF Fill Logical Volume Descriptor |
| 504 | 1F8 | Implementation Use Volume Descriptor |
| 505 | 1F9 | Terminating Descriptor |
| 506 | 1FA | Logical Volume Integrity Descriptor |
| 507 | 1FB | Terminating Descriptor |
| ... | | |
| 511 | 1FF | NULL |
| 512 | 200 | Anchor Volume Descriptor Pointer |
| 513 | 201 | Boot Catalog |
| 514 | 202 | Tools Directory |
| | | Tools |
| | | Bootimage (720 Blocks) |
| | | DOSRESTR.EXE |

SYSTEM FOR WRITING INCREMENTAL PACKET DATA TO CREATE BOOTABLE OPTICAL MEDIUM BY WRITING BOOT CATALOG AND BOOT IMAGE ONTO SECOND TRACK BEFORE WRITING VOLUME DESCRIPTORS ONTO FIRST TRACK

CROSS REFERENCE TO RELATED APPLICATIONS

The present application claims is related to co-pending U.S. patent application Ser. No. 09/464,332 filed on Dec. 15, 1999, entitled "Bootable Fixed Packet Re-writable Optical Media," by inventor Alexander G. von Below, assigned to the assignee of the present application, which is incorporated herein by reference.

BACKGROUND OF THE INVENTION

1. Field of the Invention

This invention relates generally to optical storage media, and more particularly to methods and computer readable media for writing and reading to and from compact disc (CD) media.

2. Description of the Related Art

In recent years, compact disc (CD) recording technology has made substantial advancements that have enabled casual computer users to record all types of digital data to the CD media. As is well known, there are several types of CD media recording standards and associated media. For example, ISO-9660 (also known as ECMA-119) provides a file system for CD-ROMs. Specifically, the ISO 9660 provides a standard specifying how data shall be structured on a CD-ROM. Most platforms such as Microsoft Windows® and DOS® can read CD-ROM discs conforming to the ISO 9660.

However, the ISO 9660 standard does not provide means for changing or adding data on CD-ROMs. To overcome such limitations, the OSTA Universal Disk Format (UDF) has been created to implement ISO-13346 (also known as ECMA-167). Whereas ISO-13346 is a broad, general standard for storing information on any medium, the UDF specifically provides a standard for storing data not only on CD-ROMs but also on recordable and rewritable optical discs such as CD-Recordable (CD-R) and CD-Rewritable (CD-RW) as well as DVDs. Writing data in accordance with the UDF standard provides great flexibility in terms of transferring data between a CD medium and other storage devices, such as hard disks and floppy disks.

The CD-R and CD-RW discs differ in the manner data can be written. Specifically, CD-R disc is a write once media where data can be recorded only once over a single session or during multiple sessions. This is because the data that is digitally written to the CD-R causes a permanent change in the properties of the CD-R. This change in property is often referred to as the "burning" of data onto the CD.

On the other hand, data can be written and rewritten on a CD-RW disc much like a hard disk or a floppy disk. That is, data may be written to the CD-RW and then erased and recorded again repeatedly. This is because the CD-RW, unlike CD-R, performs recording by making use of phase change materials in its recording layer. When the phase change material is irradiated by a laser beam, the data can be erased (crystal phase) and recorded (amorphous phase). Then, by way of differences in the reflectivity of either the crystal phase or amorphous phase, the data stored on the media can be read. However, data recorded on CD-RW media is typically not readable by standard CD-ROM drives due, for example, to differences in the wavelengths in the laser pickup units.

For writing to optical discs such as CD-R and CD-RW discs, the UDF standard provides writing in "incremental packet mode," which is well known and described in detail in UDF standards such as UDF 1.5 and 2.0, which are incorporated herein by reference. In the incremental packet mode, data is written in units of packets. The writing of data in units of small packets provides a more efficient means for writing data onto CD-R and CD-RW discs. For example, before the implementation of incremental packet mode, if a data stream is interrupted while writing the data to a CD-R disc, for example, the disc was no longer usable. In incremental packet mode writing, however, if a data stream is interrupted while writing data packet to the CD-R disc, only the interrupted packet becomes useless. In this case, new packets may be written after the interrupted packet such that the disc still contains useful data.

In general, optical discs are substantially cheaper than other mass storage media such as hard disk drives of comparable size. Consequently, the optical discs are being widely used to store data for a variety of purposes. For example, the CD-R and CD-RW discs are frequently used to backup one or more hard disk drives in a computer system. Additionally, the CD-R and CD-RW media may be used to store custom software for distribution. The data stored in the CD-R and CD-RW media may then be restored or installed on a computer system.

Restoring or installing data from optical media, however, often requires the use of a separate boot disk such as a floppy disk. For example, to restore data in a disaster recovery situation generally requires the user to insert a boot floppy disk to load an operating system before accessing the optical discs. In addition, installing a custom software from a CD-R or CD-RW disc often requires booting up the computer system by inserting a boot disk.

One prior art standard called "El Torito" defines a specification for a bootable CD-ROM format and is available from Phoenix Technologies and IBM. Specifically, the El Torito standard, also known as "CD/OS," specifies a bootable CD-ROM format that allows a computer system to boot up from a CD-ROM, which conforms to the El Torito standard. Thus, a separate floppy boot disk is not required. The El Torito standard is well known in the art and is incorporated herein by reference.

Unfortunately, however, the El Torito standard does not provide a solution for booting up from a CD-R or CD-RW media that conform with the UDF standard. In particular, the El Torito standard is not applicable to CD-R or CD-RW discs that are written using incremental packet writing mode. Instead, the El Torito specification is directed to providing a bootable CD-ROM only.

In view of the foregoing, there is a need for methods of writing CD-R and/or CD-RW media in an incremental packet mode to allow computers to boot up from these media without a dedicated boot disk.

SUMMARY OF THE INVENTION

Broadly speaking, the present invention fills these needs by providing methods and computer readable media for writing data to write once media or re-writable media in an incremental packet mode to allow computers to bootup from the such media without a dedicated boot disk. It should be appreciated that the present invention can be implemented in numerous ways, including as a process, an apparatus, a system, computer readable media, or a device. Several inventive embodiments of the present invention are described below.

In one embodiment, the present invention provides a method for writing incremental packet data to create a bootable optical medium. In this method, a first track is reserved in an optical medium. Additionally, a first track gap after the first track is reserved in the optical medium. After reserving the first track and first track gap, a boot catalog and a boot image are written onto a second track in the optical medium. The boot catalog includes a first pointer to the location of the boot image. Further, the boot catalog and the boot image are written so that the boot image is written contiguously without interruption. Preferably, the second track is written in a track-at-once mode to ensure that the boot image is written without interruption. Alternatively, the second track may be written in a streaming mode in a single packet after writing the first track and track gap. This also ensures that the boot image is written without interruption. Then, the first reserved track is written by writing a primary volume descriptor, a boot record volume descriptor, and a first anchor volume descriptor pointer. The boot record volume descriptor includes a second pointer to the location of the boot catalog.

In another embodiment, the present invention provides a computer implemented method for writing packet data to a recordable compact disc. The method includes: (a) reserving a first track and a first track gap in a recordable optical disc; (b) writing a boot catalog and a boot image onto a second track in the recordable optical disc, the boot catalog including a first pointer to the location of the boot image, the boot catalog and the boot image being written in a track-at-once mode so that the boot image is written continuously without interruption by other data; (c) writing a second track gap after the second track in the optical disk; (d) opening a variable length packet track and sequentially writing data in an incremental packet mode in the variable length packet track; and (e) writing a primary volume descriptor, a boot record volume descriptor, and a first anchor volume descriptor pointer onto the reserved first track, wherein the boot record volume descriptor includes a second pointer to the location of the boot catalog.

In yet another embodiment, a computer readable medium having program instructions for creating a bootable optical disc is disclosed. The program instructions in the computer readable medium comprising: (a) program instructions for reserving a first track and a first track gap in a compact disc; (b) program instructions for writing a boot catalog and a boot image onto a second track in the recordable compact disc, the boot catalog including a first pointer to the location of the boot image, the boot catalog and the boot image being written such that the boot image is written continuously without interruption by other data; and (c) program instructions for writing a primary volume descriptor, a boot record volume descriptor, and a first anchor volume descriptor pointer onto the reserved first track, wherein the boot record volume descriptor includes a second pointer to the location of the boot catalog. The second track may be written in either a track-at-once mode or a streaming mode to ensure that the boot image is written continuously without interruption.

Advantageously, the present invention allows computer systems to boot up directly from optical medium (e.g., CD-R, CD-RW discs) without using a dedicated bootup disk. In addition, by using track-at-once mode to write one or more boot images in combination with a variable length packet track, the methods of the present invention ensures that the boot images are not interrupted. Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, in which like reference numerals designate like structural elements.

DETAILED DESCRIPTION OF THE PREFERRED EMBODIMENTS

An invention is described for methods of writing CD-R and CD-RW media in an incremental packet mode to allow computers to boot up from these media without a dedicated boot disk. It will be obvious, however, to one skilled in the art, that the present invention may be practiced without some or all of these specific details. In other instances, well known process operations have not been described in detail in order not to unnecessarily obscure the present invention.

Figure 1A:
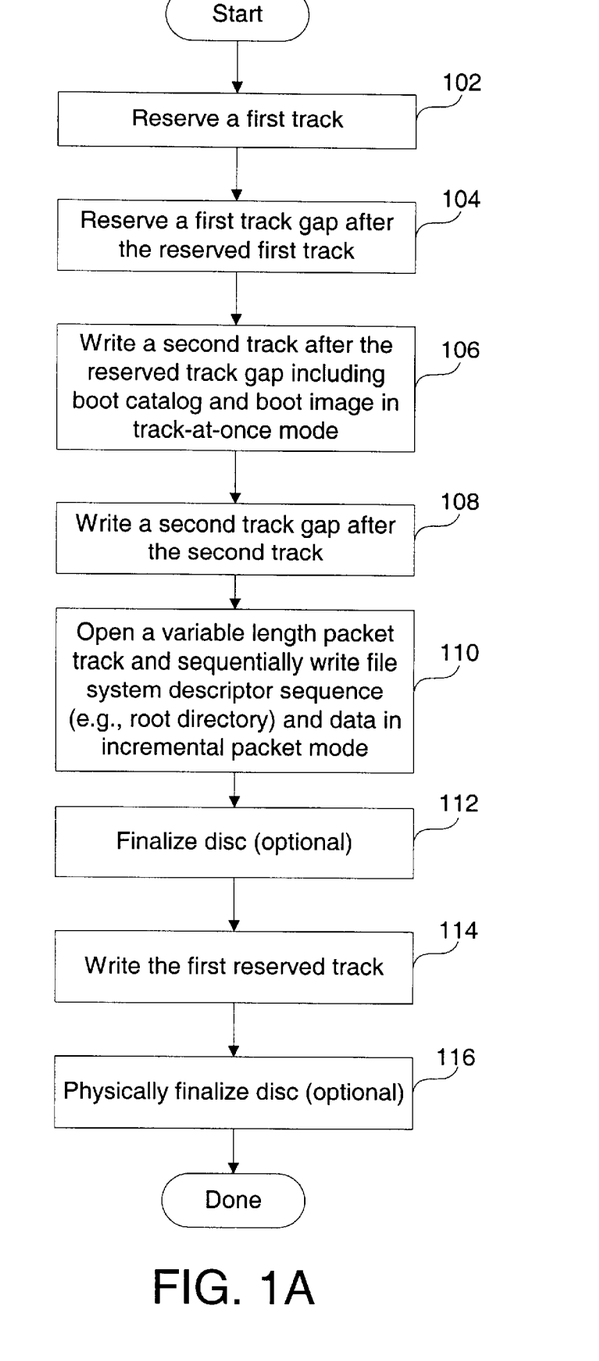
FIG. 1A is a flowchart of an exemplary method for writing data in incremental packet mode to create a bootable CD-R disc in accordance with one embodiment of the present invention.

FIG. 1A is a flowchart of an exemplary method for writing data in incremental packet mode to create a bootable CD-R disc in accordance with one embodiment of the present invention. It should be understood, however, that the media can be any suitable optical media upon which data can be written once or re-written such as a CD-RW disc. The method starts by reserving a first track in a CD-R disc in operation 102. Although the first track may be any suitable size, it preferably contains 348 blocks with each block having 2,048 bytes. At this time, no data is written to the reserved first track. After reserving the first track, a first track gap is reserved, in operation 104, after the reserved first track on the CD-R disc. Preferably, 152 blocks with each block having 2,048 bytes are reserved for the first track gap.

After the first track and first track gap have been reserved on the CD-R disc, a second track is written on the CD-R disc including a boot catalog and a boot image in incremental packet writing mode. In one embodiment, once the first track and first track gap have been reserved on the CD-R, a second track is written on the CD-R including a boot catalog and a boot image in track-at-once-mode. As is well known, the track-at-once-mode is a method of writing data, one track at a time, to an optical media such as CD-R. In one embodiment, with the first track and first track gap occupying 500 blocks from block 0 to block 499, the second track starts from block 500, where basic UDF structures are written. In the second track, El Torito structures, which is based on ISO-9660 standard, that enable computer systems to boot up from a CD is written. Specifically, a boot catalog and a boot image are written, preferably aligned to the block boundaries of 2,048 bytes. The boot catalog contains a pointer to the boot image and is preferably written in a block. For example, as described in El Torito standard, the boot catalog contains an absolute pointer to the boot catalog and is a collection of 20 byte entries, packed 40 entries to the sector.

Additionally, the boot catalog may also include various platform information such as Intel™, Motorola™, PowerPC™, UNIX™, LINUX™, etc. The platform information allows a computer system to boot up from a boot image corresponding to its platform. In this case, a boot image is provided in the second track for each of the platforms to be supported.

The boot image emulates a source medium such as a floppy disk (e.g., 1.44-Mbyte floppy disk, 2.8-Mbyte floppy disc, etc.), a hard disk, removable disk, or any bootable source medium. Writing the second track in the track-at-once-mode allows varying boot image sizes to be written in the track. That is, boot images of any suitable size can be written in the second track without interruption. This ensures a computer system to boot up properly without locking up.

In addition, UDF data such as logical volume descriptor sequence and an anchor volume descriptor pointer are written onto the second track. The logical volume descriptor sequence provides descriptive information such as partitioning of an optical disc, type of medium and size of the optical disc, etc. On the other hand, the AVDP indicates that the optical disc contains an UDF file system. Following this, a file system descriptor sequence is written.

After the second track has been written in track-at-once mode, a second track gap is written in operation 108. Like the first track gap, the second track gap also contains 152 blocks, each of which includes 2,048 bytes. Preferably, one track gap is provided between a pair of consecutive tracks in the CD-R disc.

Upon writing the second track gap, a variable length packet track is opened and a file system descriptor sequence and data are sequentially written in an incremental packet writing mode in operation 110. In this track, the variable length refers to the length of the packets. The file system descriptor sequence, which is well known in the art, describes a logical organization of data on a disc so that application programs need not be concerned with physical location or structure of the data. For example, a root directory for UDF that arranges the files in the CD-R disc hierarchically to facilitate file access can be written as part of the file system descriptor sequence. Typically, the root directory for UDF defines the last starting point for the UDF on the disc. In addition, a block containing the first occurrence of the virtual allocation table (VAT), also known as VAT Information Control block (VAT-iCB), may be written following the root directory.

After writing various file system descriptor sequence, the file system driver for UDF picks up and writes the data using incremental packets in the variable length packet track according to a UDF standard (e.g., UDF 1.50, UDF 2.0, etc.). Once the desired data has been written, the locations of the data are known. At this point, other UDF structures may be written on the track during a finalization process in operation 112. By way of example, when disc is to be exchanged with other systems, especially those only using a CD-ROM drive as opposed to a CD-R or CD-RW drive, the disc may be finalized. During the finalization process, a Virtual Allocation Table (VAT) as defined in UDF 1.50 is realized so that only real physical addresses are left. For example, the UDF standard typically assigns virtual block numbers that are internally translated to physical block numbers. To facilitate the use of the disc in another system, the virtual partition are translated into corresponding physical addresses. Such translation facilitates and speeds up reading of the disc. For instance, it allows the disc to be read by compact disc reading devices that comply only to version 1.02 of UDF, which did not include VATs introduced in UDF version 1.50. Additionally, other conventional UDF information may be written. At this point, the variable packet track is closed.

When the desired data has been written to the variable length packet track, the first reserved track is opened and written in track-at-once mode in operation 114. In one embodiment, starting from block 16, the ISO 9660 primary volume descriptor and other ISO-9660 data are written. For example, in block 16, the primary volume descriptor is written in accordance with the conventional ISO-9660 standard. Then, in block 17, a boot record volume descriptor, which points to the location of the boot catalog, is written. In block 18, ISO-9660 information such as root directory for ISO-9660, restore application, and other information accessible from ISO-9660 may be written to point to reference data in the second track since the first track is limited in size. Additionally, in block 256 of the first track, a final AVDP is written. Further, other information such as new logical volume descriptor sequence, final UDF information, and boot information required by various operating systems, if desired, may be written in the first track. Once all desired information has been written, the disc is physically finalized by writing a lead-in and lead-out and the session is closed in operation 116.

As is well known, some conventional recording devices implement streaming method of writing data where a single packet can be as large as the entire recording medium. The streaming method allows a variable length packet to be written either until the packet is closed or a buffer under-run occurs, in which case the packet becomes useless. The conventional streaming method, however, offers some advantages in that the size of the data to be written need not be known beforehand. In addition, it allows writing of data in an uninterrupted fashion if the data delivery is delivered on-the-fly. Typically, however, the size of the packet is limited to a specified size such as 1,024 Kbytes. For most boot images, such a limited size would not be sufficient to hold an entire boot image of, for example, a 1.44-Mbyte floppy disk.

Figure 1B:
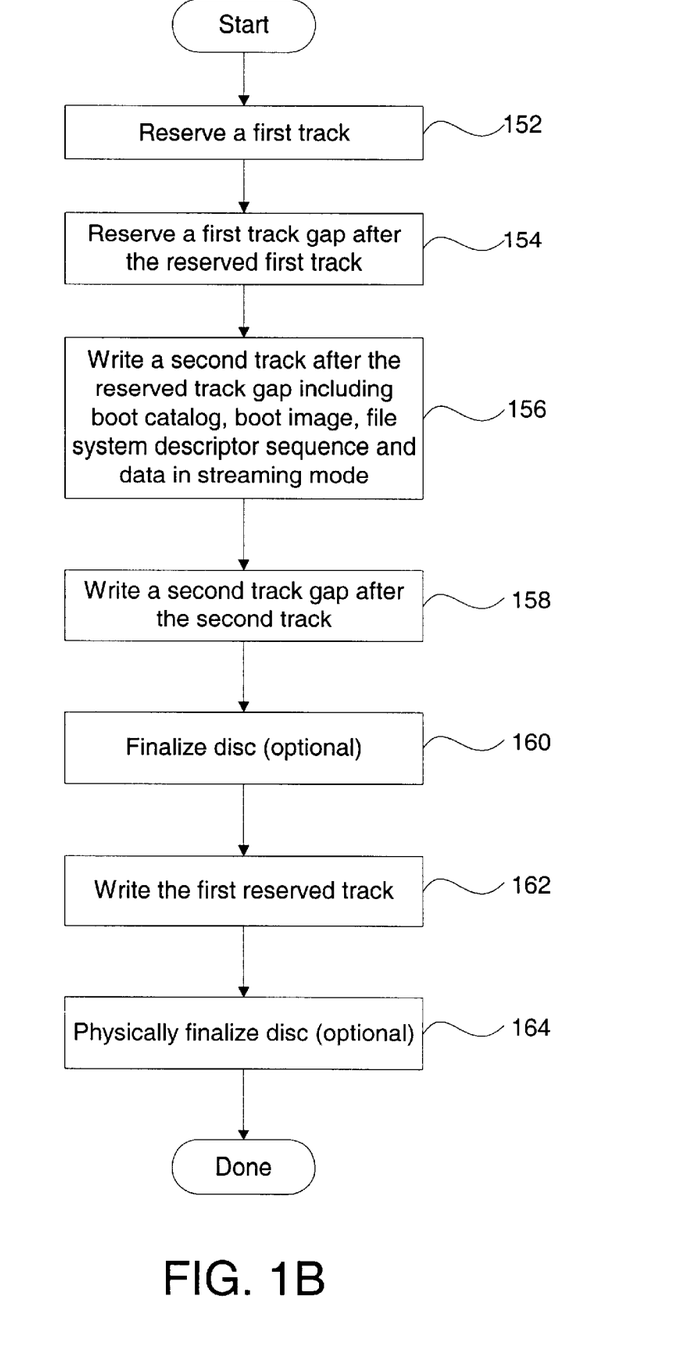
FIG. 1B is a flowchart of an exemplary method for writing data in streaming mode to create a bootable CD-R disc in accordance with one embodiment of the present invention.

In another embodiment, the present invention allows the streaming method to be implemented when the size of the packet is sufficiently large to accommodate the boot image and other information. In this case, instead of writing the second and the variable length track, the information contained in the second track and the variable length packet is written in a streaming mode in a single variable length packet after writing the first track and track gap. For example, in an alternative embodiment, instead of writing the second track followed by a variable length packet track in operations 108 and 110, a single track is written using a streaming mode in a single packet. FIG. 1B shows a flowchart of a method where the information in the second track and the variable length packet track in FIG. 1A are written, in operation 156, in a single packet including the boot image and the boot catalog. In the streaming mode, data is written in a variable length packet until the track is closed or a buffer under-run occurs. This mode of writing data is well known and provides some advantages in that the size of data to be written need not be known in advance. In addition, data can be written uninterrupted if the data delivery is of sufficient speed. Accordingly, the streaming mode of writing the boot image in the single packet ensures that the image is written without interruption.

Figure 2:
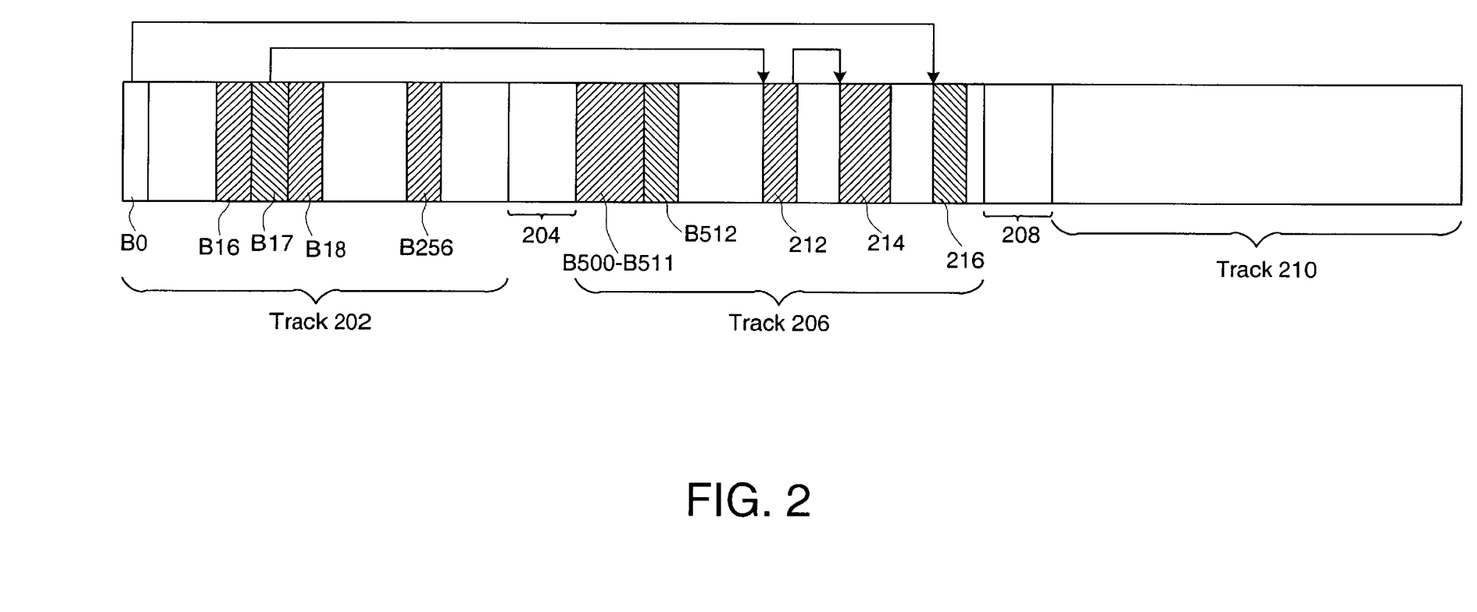
FIG. 2 is a schematic block diagram of an exemplary bootable CD-R disc created using the method of FIG. 1A in accordance with one embodiment of the present invention.

FIG. 2 is a schematic block diagram of an exemplary bootable CD-R disc 200 created using the method of FIG. 1A in accordance with one embodiment of the present invention. The CD-R disc 200 includes a first track 202, a first track gap 204, a second track 206, a second track gap 208, and a variable length packet track 210. For convenience of illustration, the tracks are illustrated linearly instead of the typical spiral configuration.

The first track 202 includes blocks B0, B16, B17, B18, and B256 for writing various information. For example, the block B0 can be used to store a pointer to a boot image or a partition in the second track and other boot information needed for booting up an Apple MacIntosh computer platform. If the partition contains a bootable boot image in block 216 of track 206, the computer will boot up using the boot image in that block.

The block B16 stores the primary volume descriptor in accordance with the conventional ISO-9660 standard. For example, the primary volume descriptor includes well known information such as volume descriptor type, standard identifier, volume descriptor version, system identifier, volume identifier, volume set size, volume sequence number, logical block size, path table size, directory record for root directory, etc. On the other hand, the block B17 stores one or more boot record volume descriptors, which points to the locations of the associated boot catalogs in block 212 in the second track. For example, CD/OS boot block with a pointer to the boot catalog can be written amidst other ISO-9660 data. It should be noted that more than one boot record volume descriptor and boot catalog may be provided in the disc 200 to accommodate a plurality of platforms.

In block B18, the disc 200 stores ISO-9660 information such as root directory with an entry for a restore application (e.g., DOS executable that can read the UDF part of the disc) and, if present, an entry to a tools directory such as format, fdisk, etc. In addition, the first track 202 may include other ISO-9660 data such as "Read Me" files to inform the user what the disc is as well as a UDF driver for installation. Further, UDF data such as the final volume descriptor sequence (VDS) and the final AVDP may be written in block B256.

Figure 3:
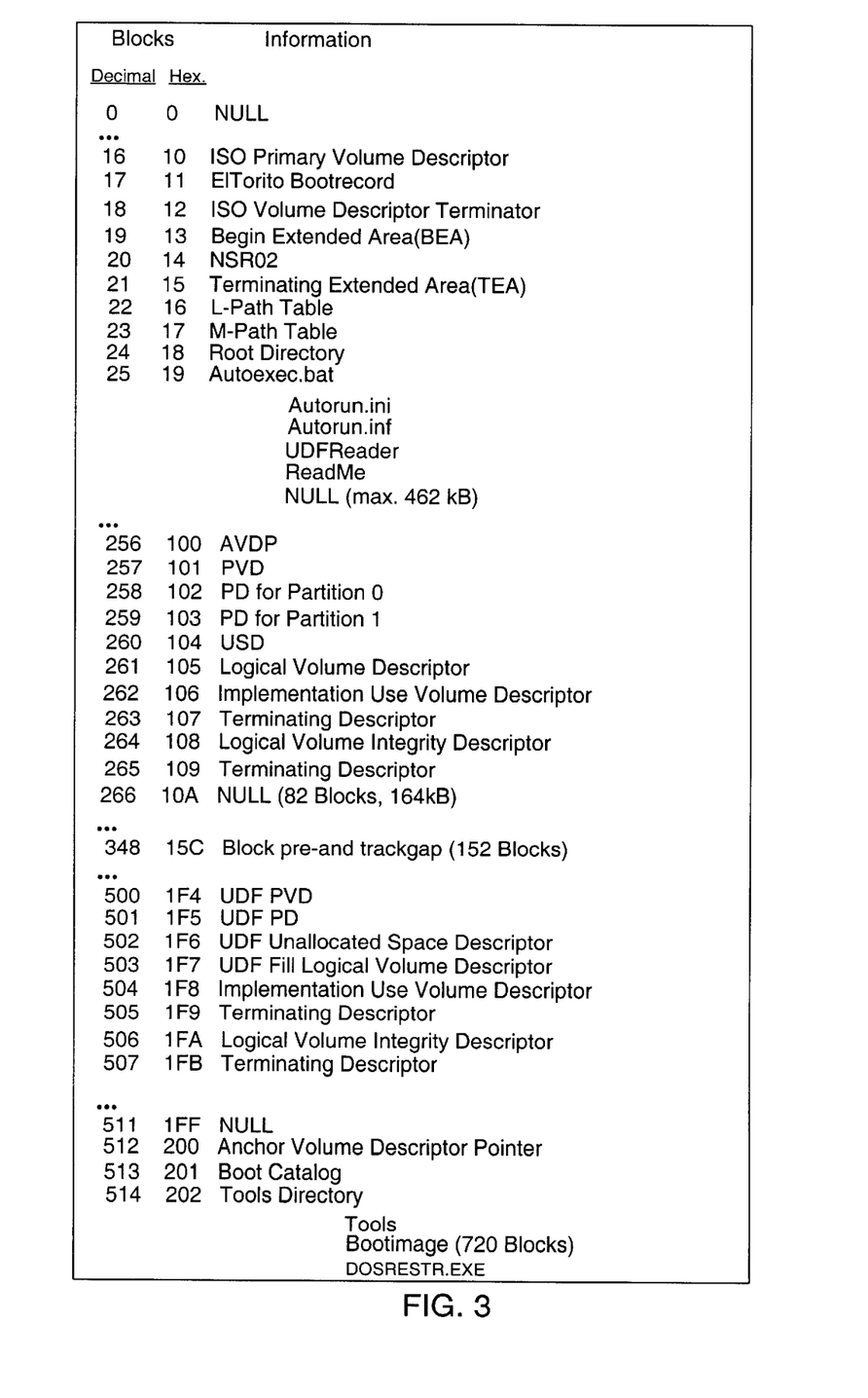
FIG. 3 illustrates a more detailed list of blocks and associated information therein in accordance with one embodiment of the present invention.

In the second track 206, the VDS is received and written into blocks between B500 and B511. In the next block B512, AVDP and other conventional UDF data are written. Then, the CD/OS boot catalog and the boot image are written in subsequent block locations 212 and 214. The CD/OS boot catalog contains a pointer to the location 214 of the boot image. It should be appreciated that more than one boot catalogs and boot images may be provided in the second track for a various platforms. In addition, the restore application and an optional ISO Tools directory and its content may be written to the second track. The second track is written under track-at-once mode to accommodate some recorders that cannot handle packets over a certain size and to ensure that the boot image is not interrupted. After the second track gap 208, the variable packet track 210 is written as described in FIG. 1. FIG. 3 illustrates a more detailed list of blocks and associated information therein in accordance with one embodiment of the present invention.

In one embodiment, the boot record volume descriptor in block 17 contains information as defined in El Torito standard and shown in the following Table 1.

TABLE 1

| Offset | Type | Description |
| --- | --- | --- |
| 0 | Byte | Boot Record Indicator, must be 0 |
| 1–5 | Byte | ISO-9660 Identifier, must be "CD001" |
| 6 | Byte | Version of this descriptor, must be 1 |
| 7–26 | Byte | Boot System Identifier, must be "EL TORITO SPECIFICATION" padded with 0's |
| 27–46 | Byte | Unused, must be 0 |
| 47–4A | Dword | Absolute pointer to first sector of Boot Catalog |
| 4A–uFF | Byte | Unused, must be 0 |

In accordance with preferred embodiment of the present invention, the boot image is an emulation of a floppy or hard disk in a computer system. Creating a boot image is well known in the art. For example, El Torito standard describes creating a boot image by reading from the source media as if it were a Logical-Block Addressable (LBA) device and incrementing the logical-block value until all sectors have been read. Then all blocks are concatenated in a single file. The LBA translation can be performed as follows:

LBA 0=Cylinder 0, Head 0, Sector 1;

and $LBA\ X$=((Cylinder*Maximum Heads+Head)*Sectors per Track)+ Sector−1.

The resulting file is placed on the disc in ISO-9660 format along with a catalog entry.

Figure 4:
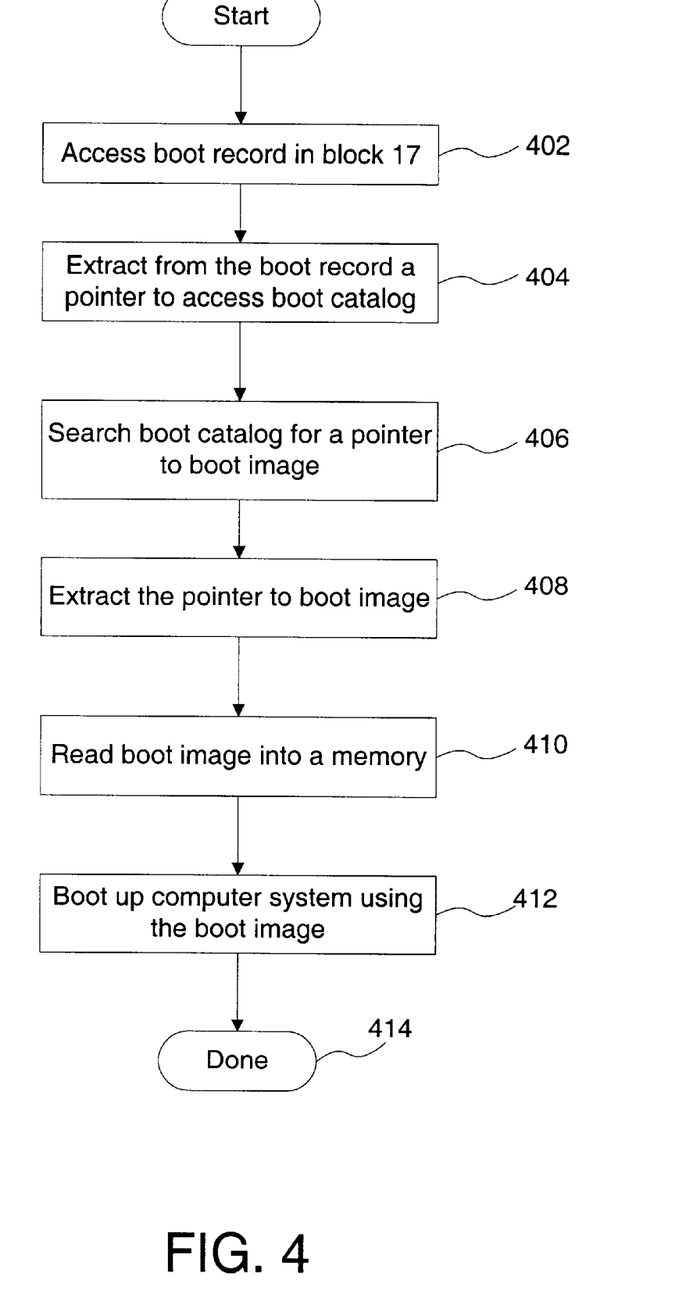
FIG. 4 shows a flowchart of a method for booting up a computer system from a bootable disc in accordance with one embodiment of the present invention.

A computer system may use the bootable disc 200 to boot up as shown in FIG. 4. FIG. 4 shows a flowchart of a method for booting up a computer system from a bootable disc 200 in accordance with one embodiment of the present invention. In this method, the boot record in block B17 of the track 202 is accessed in operation 402 and a pointer to the boot catalog 212 in track 206 is extracted in operation 404. Using the pointer to access the boot catalog 212, the boot catalog 212 is searched for a pointer to the boot image 214 in operation 406. Once the pointer to the boot image 214 has been located, it is extracted in operation 408. Then, the boot image 214 from the second track 206 is loaded into a memory in the computer system in operation 410. The computer system then boots up using the boot image in the memory in operation 412. The method then terminates in operation 414.

Figure 5:
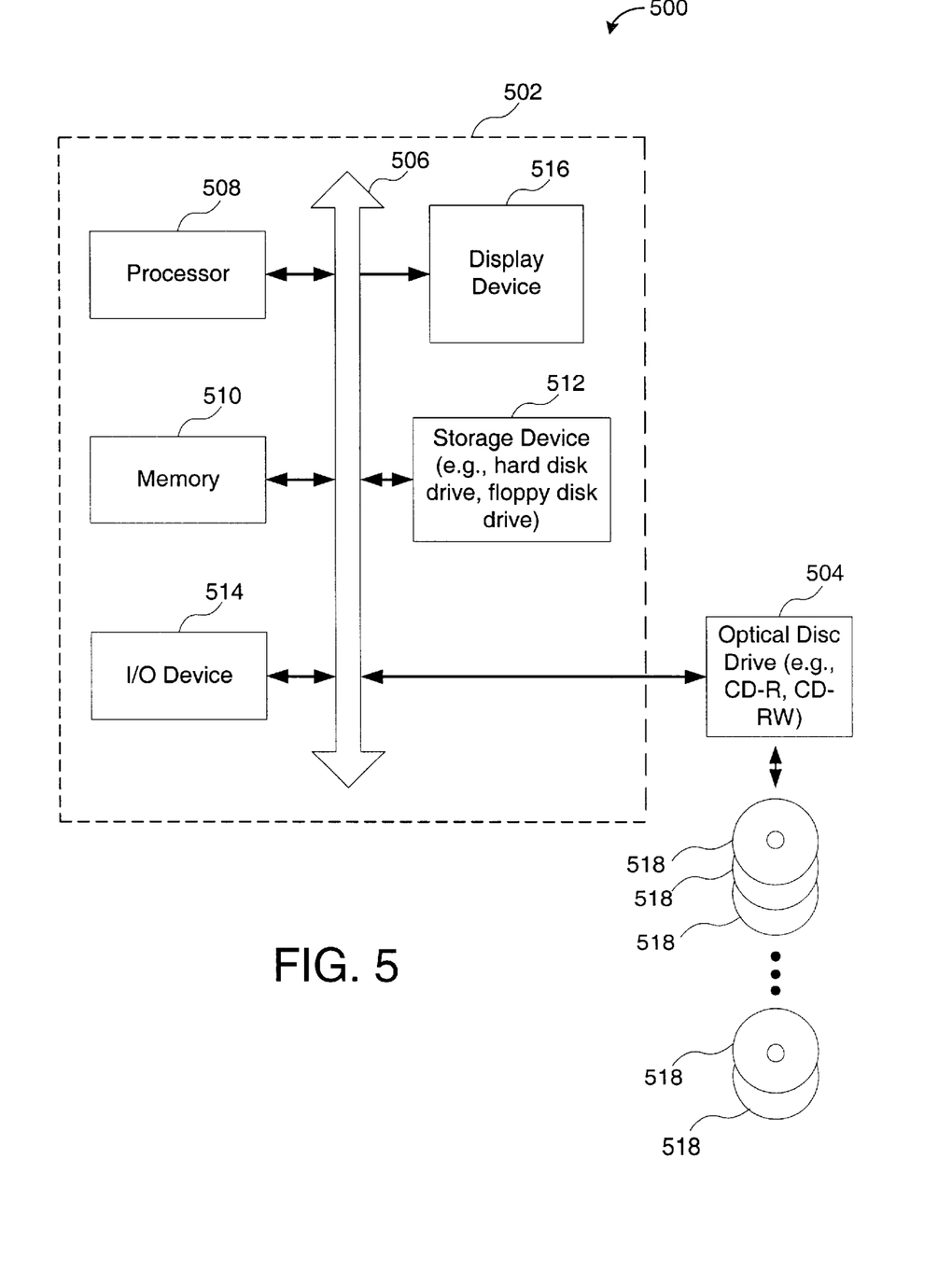
FIG. 5 shows a block diagram of an exemplary computer system including a host computer and an optical disc drive in accordance with one embodiment of the present invention.

FIG. 5 shows a block diagram of an exemplary computer system 500 including a host computer 502 and an optical disc drive 504 in accordance with one embodiment of the present invention. The optical disc drive 504 may be any device suitable for recording data on optical discs such as CD-R drive, CD-RW drive, and the like. It should be appreciated that the computer system 500 is exemplary only and that the present invention can operate within a number of different computer system configurations including general purpose computer systems, embedded computer systems, and computer systems specially adapted to electronic design automation. In describing various embodiments of the present invention, certain processes and operations are realized as a series of instructions (e.g., software programs) that reside within computer readable memory units of computer system 500 and are executed by processors therein.

The host computer 502 includes a bus 506 for communicating information, a processor 508 coupled to the bus for processing information (e.g., instructions, programs, data, etc.), a memory 510 coupled to the bus 506 for storing information and instructions for the processor 508, and a storage device 512 coupled to the bus 506 for storing information and instructions. The storage device 512 in the host computer 502 may include one or more hard disk drives, floppy disk drives, optical disk drives, tape drives, CD-ROM drives, or any number of other types of storage devices having media for storing data digitally.

The optical disc drive 504 is coupled to the bus 506 for communicating information to the host computer 502. The optical disc drive 504 may be provided either internally within the host computer 502 or externally through a suitable cable. The optical disc drive 504 is coupled to the computer system 500 through a bus such as SCSI, IDE, ATAPI, etc. The host computer 502 also includes and an I/O device 514 coupled to the bus for inputting and/or outputting information and a display device 516 coupled to the bus 506 for displaying information to the computer user.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device, which can store data that can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for writing incremental packet data to create a bootable optical medium, comprising:

reserving a first track in an optical medium;

reserving a first track gap after the first track in the optical medium;

writing a boot catalog and a boot image onto a second track in the optical medium, the boot catalog including a first pointer to the location of the boot image, the boot catalog and the boot image being written so that the boot image is written contiguously without interruption; and writing a primary volume descriptor, a boot record volume descriptor, and a first anchor volume descriptor pointer onto the reserved first track, wherein the boot record volume descriptor includes a second pointer to the location of the boot catalog.

2. The method as recited in claim 1, further comprising:

after writing the second track, writing a second track gap after the second track in the compact disk;

opening a variable length packet track and writing a root directory; and sequentially writing data in an incremental packet mode in the variable length packet track before writing the reserved first track.

3. The method as recited in claim 1, wherein the second track is written in a track-at-once mode such that the boot image is written continuously without interruption.

4. The method as recited in claim 1, wherein the second track is written in a streaming mode in a single packet such that the boot image is written continuously without interruption.

5. The method as recited in claim 1, wherein the optical medium is a CD-R disc.

6. The method as recited in claim 1, wherein the optical medium is a CD-RW disc.

7. The method as recited in claim 1, wherein the first track includes 348 blocks and the first track gap includes 152 blocks, wherein each block includes 2,048 bytes.

8. The method as recited in claim 1, wherein the boot image is generated by emulating a floppy disk.

9. The method as recited in claim 1, wherein the boot image is generated emulating a hard disk.

10. The method as recited in claim 7, wherein a second anchor volume descriptor pointer is written at block 512 of the second track for pointing to a logical volume descriptor sequence in the second track that contains a virtual partition.

11. The method as recited in claim 7, wherein the primary volume descriptor, the boot record volume descriptor, and the first anchor volume descriptor pointer are written in blocks 16, 17, and 256, respectively, and wherein the first anchor volume descriptor pointer is configured to point to a logical volume descriptor sequence in the first track that contains a physical partition.

12. The method as recited in claim 3, further comprising:

finalizing the compact disk by writing lead-in and lead-out information that indicate a starting location and an ending location, respectively, in the compact disc.

13. The method as recited in claim 1, wherein a computer system boots up from the bootable compact disc by:

accessing the boot record and extracting the second pointer to the location of the boot catalog;

accessing the boot catalog and extracting the first pointer to the location of the boot image;

accessing the boot image; and booting up the computer system using the accessed boot image.

14. A computer implemented method for writing packet data to a recordable optical disc, comprising:

reserving a first track and a first track gap in a recordable optical disc;

writing a boot catalog and a boot image onto a second track in the recordable optical disc, the boot catalog including a first pointer to the location of the boot image, the boot catalog and the boot image being written in a track-at-once mode so that the boot image is written continuously without interruption by other data;

writing a second track gap after the second track in the optical disk;

opening a variable length packet track and sequentially writing data in an incremental packet mode in the variable length packet track; and writing a primary volume descriptor, a boot record volume descriptor, and a first anchor volume descriptor pointer onto the reserved first track, wherein the boot record volume descriptor includes a second pointer to the location of the boot catalog.

15. The method as recited in claim 14, wherein the recordable optical disc comprises a CD-R disc or a CD-RW disc.

16. The method as recited in claim 14, wherein the first track includes 348 blocks and the first track gap includes 152 blocks, wherein each block includes 2,048 bytes.

17. The method as recited in claim 14, wherein the boot image is generated by emulating a source medium selected from a floppy disk and a hard disk.

18. The method as recited in claim 16, wherein a second anchor volume descriptor pointer is written at block 512 of the second track for pointing to a logical volume descriptor sequence in the second track that contains a virtual partition.

19. The method as recited in claim 16, wherein the primary volume descriptor, the boot record volume descriptor, and the first anchor volume descriptor pointer are written in blocks 16, 17, and 256, respectively, and wherein the first anchor volume descriptor pointer is configured to point to a logical volume descriptor sequence in the first track that contains a physical partition.

20. The method as recited in claim 14, further comprising:
    finalizing the recordable optical disk by writing lead-in and lead-out information that indicate a starting location and an ending location, respectively, in the optical disc.

21. The method as recited in claim 14, wherein a computer system boots up from the bootable optical disc by:
    accessing the boot record to extract the second pointer to the location of the boot catalog;
    accessing the boot catalog to extract the first pointer to the location of the boot image;
    loading the boot image into a memory in the computer system; and
    booting up the computer system in response to the loaded boot image.

22. A computer readable medium having program instructions for creating a bootable optical disc, the operations of the computer readable medium comprising:
    program instructions for reserving a first track and a first track gap in a recordable optical disc;
    program instructions for writing a boot catalog and a boot image onto a second track in the recordable optical disc, the boot catalog including a first pointer to the location of the boot image, the boot catalog and the boot image being written so that the boot image is written continuously without interruption; and
    program instructions for writing a primary volume descriptor, a boot record volume descriptor, and a first anchor volume descriptor pointer onto the reserved first track, wherein the boot record volume descriptor includes a second pointer to the location of the boot catalog.

23. The computer readable medium as recited in claim 22, further comprising:
    program instructions for writing a second track gap after writing the second track in the recordable optical disk; and
    program instructions for opening a variable length packet track and sequentially writing data in an incremental packet mode in the variable length packet track.

24. The computer readable medium as recited in claim 23, wherein the second track is written in a track-at-once mode such the boot image is written continuously without interruption.

25. The computer readable medium as recited in claim 22, wherein the second track is written in a streaming mode in a single packet such that the boot image is written continuously without interruption.

26. The computer readable medium as recited in claim 22, wherein the recordable optical disc is a CD-R disc or a CD-RW disc.

27. The computer readable medium as recited in claim 22, wherein the first track includes 348 blocks and the first track gap includes 152 blocks, wherein each block includes 2,048 bytes.

28. The computer readable medium as recited in claim 22, wherein the boot image is generated by emulating a source medium selected from a floppy disk and a hard disk.

29. The computer readable medium as recited in claim 27, wherein a second anchor volume descriptor pointer is written at block 512 of the second track for pointing to a logical volume descriptor sequence in the second track that contains a virtual partition.

30. The computer readable medium as recited in claim 27, wherein the primary volume descriptor, the boot record volume descriptor, and the first anchor volume descriptor pointer are written in blocks 16, 17, and 256, respectively, and wherein the first anchor volume descriptor pointer is configured to point to a logical volume descriptor sequence in the first track that contains a physical partition.

31. The computer readable medium as recited in claim 22, further comprising:
    program instructions for finalizing the recordable optical disk by writing lead-in and lead-out information that indicate a starting location and an ending location, respectively, in the optical disc.

32. The computer readable medium as recited in claim 22, further comprising:
    program instructions for accessing the boot record to extract the second pointer to the location of the boot catalog;
    program instructions for accessing the boot catalog to extract the first pointer to the location of the boot image;
    program instructions for loading the boot image into a memory in the computer system; and
    program instructions for booting up the computer system in response to the loaded boot image.

* * * * *